United States Patent [19]

Senn

[11] 3,849,599

[45] Nov. 19, 1974

[54] APPARATUS FOR DECIPHERING CIPHER CODE PRESENT AT INFORMATION CARRIERS IN THE FORM OF CHARACTER GROUPS OF THE SAME NUMBER OF DIGITS

[76] Inventor: Werner Josef Senn, Buhlmattweg 13, Baar, Switzerland

[22] Filed: Nov. 8, 1972

[21] Appl. No.: 304,743

[30] Foreign Application Priority Data

Nov. 10, 1971 Switzerland ...................... 16329/71

[52] U.S. Cl. ........................ 178/53.1 R, 235/92 DP

[51] Int. Cl. ............................................. H04l 1/00

[58] Field of Search ......... 235/92 EC, 92 DP, 92 R, 235/153 A, 61.11; 340/146.4 AJ, 146.1 F; 178/53.1 R

[56] References Cited

UNITED STATES PATENTS

| | | | |
|---|---|---|---|
| 2,914,612 | 11/1959 | Davey et al. | 178/53.1 R |
| 3,022,375 | 2/1962 | Davey | 178/53.1 R |
| 3,272,969 | 9/1966 | Cutaia | 235/61.11 D |
| 3,351,933 | 11/1967 | Maltby et al. | 178/53.1 R |
| 3,419,679 | 12/1968 | Elvis et al. | 178/53.1 R |
| 3,587,044 | 6/1971 | Jenkins | 340/146.1 AJ |
| 3,639,729 | 2/1972 | Marshall | 235/61.11 E |

*Primary Examiner*—Thomas J. Sloyan
*Attorney, Agent, or Firm*—Ostrolenk, Faber, Gerb & Soffen

[57] ABSTRACT

An apparatus for deciphering cipher codes present at an information carrier in the form of character groups of the same length, comprising a reader for the information carrier, the reader being driven by a clock and a deciphering unit controlled by both the clock as well as the reader. There is provided a signal evaluation device controlled by the reader and which responds to the type of signals delivered thereto by the reader. The signal evaluation device is coupled with a signal counter the counting capacity of which is cyclically dependent upon the number of characters and upon reaching a count corresponding to one of its counting capacities automatically resets to 0, and wherein the signal evaluation device sets the signal counter in the presence of a technical signal from 0 to 1 and thereafter during each text character signal always further indexes such through 1 step. The signal counter stops the clock as soon as the signal counter in its 0-position receives a text character signal or in a position deviating from its 0-position receives a technical signal.

5 Claims, 2 Drawing Figures

APPARATUS FOR DECIPHERING CIPHER CODE PRESENT AT INFORMATION CARRIERS IN THE FORM OF CHARACTER GROUPS OF THE SAME NUMBER OF DIGITS

BACKGROUND OF THE INVENTION

The present invention relates to a new and improved construction of apparatus for deciphering ciphered text present at information carriers in the form of character groups of the same length and incorporates a reader for the information carrier driven by a clock or timer and a deciphering unit controlled both by the clock as well as also by the reader.

During the transmission of an enciphered text which is divided into character groups of the same number of characters, by means of a teleprinter or telecommunications network, transmission errors can arise. Thus, it is possible that a technical signal can be transformed, due to distortion or garbling into a text character signal or vice versa.

Such type faults can produce errors in the meaning of a message at the deciphering installation arranged at the receiver, since a false signal causes the deciphering unit to fall out of step.

SUMMARY OF THE INVENTION

Therefore, it is a primary object of the present invention to provide an apparatus for deciphering ciphered text present at information carriers in the form of character groups of the same length which eliminates the aforementioned drawbacks existent with prior art equipment of this type.

Another and more specific object of the present invention relates to an improved apparatus for deciphering ciphered texts present, for instance, at perforated information carriers in the form of character groups of the same length which renders possible determination of transmission errors and to appropriately shutdown the deciphering installation.

Now in order to implement these and still further objects of the invention, which will become more readily apparent as the description proceeds, the inventive apparatus is manifested by the features that there is provided a signal evaluation device controlled by the reader, the signal evaluation device responding to the type of signals delivered thereto by the reader. Further, this signal evaluation device is coupled with a signal counter, the counting capacity of which is cyclically dependent upon the number characters. The signal counter automatically resets to 0 upon reaching a count corresponding to one of its counting capacities. The signal evaluation device sets the signal counter in the presence of a technical signal from 0 to 1 and thereafter in the presence of each text character signal always indexes the counter by 1. The signal counter shuts down the clock as soon as the signal counter receives in its 0-position a text character signal or in a position deviating from the 0-position a technical signal.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
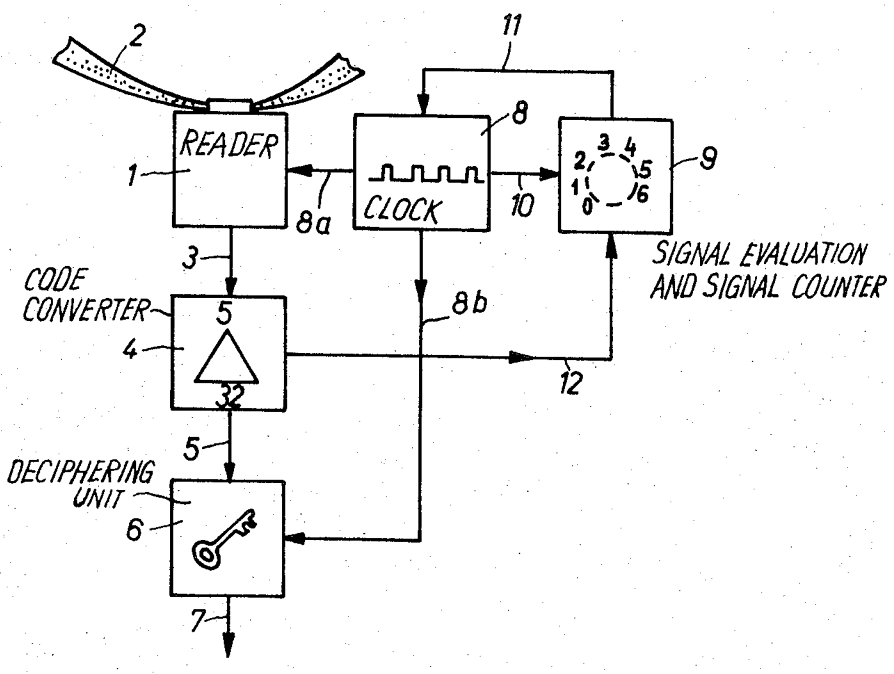
FIG. 1 is a block circuit diagram of an exemplary embodiment of apparatus for deciphering ciphered texts and designed according to the teachings of the present invention.

Describing now the drawings, the exemplary embodiment of apparatus depicted in FIG. 1 incorporates a perforated tape reader or scanner 1 which serves to scan a ciphered text which is punched in such a tape 2. In the example under consideration, the ciphered text is described as being divided into five character groups, but of course it is to be expressly understood that any other appropriate desired number of characters can be employed.

In accordance with the standard international teleprinter code CCITT No. 2, the individual ones of the 32 characters of the telegraph alphabet are portrayed by five binary elements or bits. Accordingly, the perforated tape scanner 1 is coupled through the agency of five conductors 3 with a code converter 4 for converting the five digit character system into the 32-character alphabet. However, it is possible to employ other suitable transmission codes, in which case the code converter need only be appropriately constructed.

This code converter 4 is coupled through the agency of 26 conductors 5, each respectively associated with one of the text characters of the alphabet, with a deciphering unit 6 which in known manner consists of a key character generator and a logic coupling circuit. At the output 7 of that deciphering unit 6 there appears the deciphered plain text.

The reader or scanner 1 is driven by a clock or timer 8, as indicated by the line 8*a* and this clock 8 also controls the deciphering unit 6, as indicated by the line 8*b*. The clock 8 is likewise coupled through the agency of two conductors 10 and 11 with a signal evaluation device and signal counter, generally indicated by reference character 9, which are coupled via conductor 12 with the code converter 4.

Figure 2:
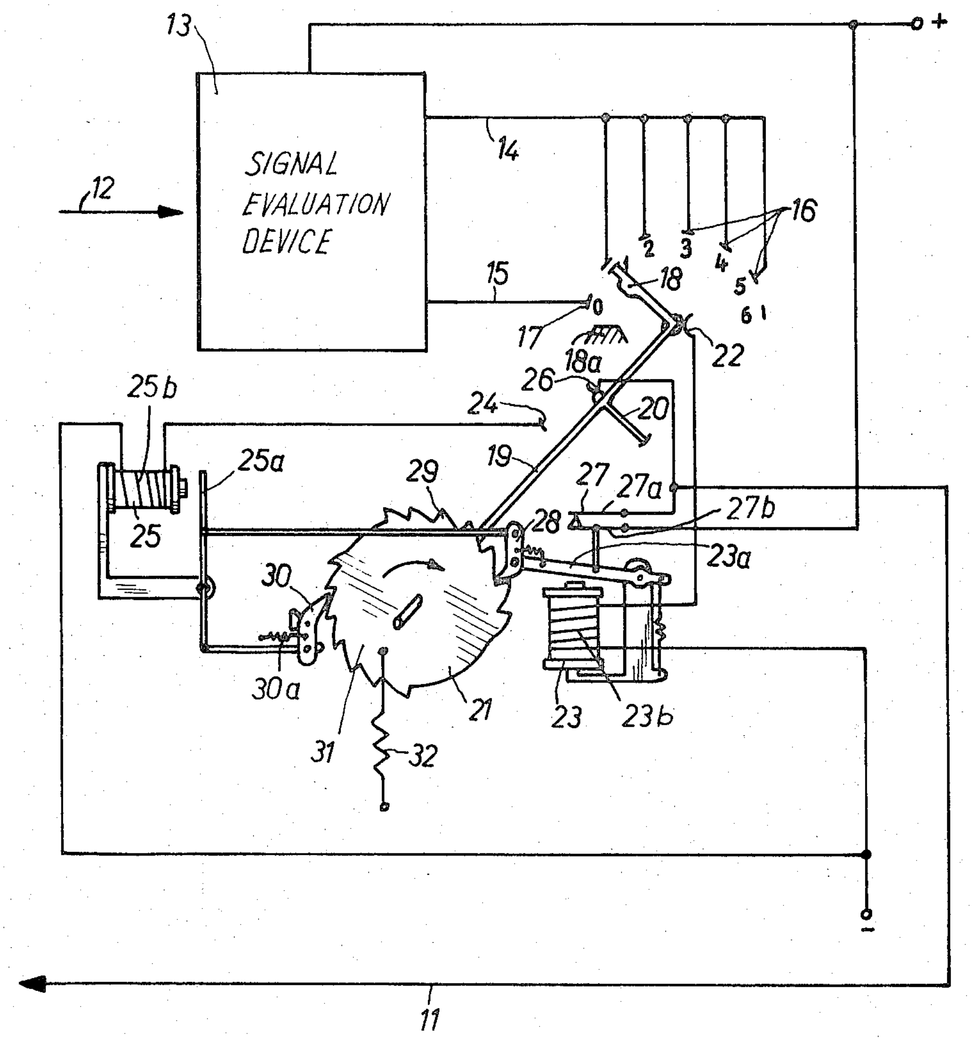
FIG. 2 is a schematic circuit diagram of the signal evaluation device and the signal counter employed in the apparatus hardware of FIG. 1.

FIG. 2 portrays details of the signal evaluation device and signal counter 9 of FIG. 1. Information arriving from the code converter 4 via the conductor 12 is delivered to the input of a signal evaluator or evaluation device 13. The signal evaluation device 13 in principle constitutes a switch which delivers the arriving text character signals to an output conductor 14 and the technical signals to an output conductor 15.

The construction of the signal evaluation device 13 is depending upon the nature of the information delivered to its input. For instance, if characters in the form of five digit binary character representation are delivered to the signal evaluation device 13 by means of the conductor 12, then the signal evaluation device 13 can be designed as a branch network as such has been disclosed for instance at page 6 of the text authored by Schiewek, entitled "Fernschreibtechnik," 4th Edition, publisher C. F. Winter Prien.

The output conductor 14 is coupled with the contacts 16 which are referenced by numerals 1–6, whereas the output conductor 15 is coupled with the contact 17 designated by 0.

A first contact arm or wiper 18 cooperates with the contacts 16 and 17, contact arm 18 being mounted upon a shaft 19 upon which there is additionally secured a second contact arm 20 and a ratchet wheel 21.

The first contact arm 18 is connected via a sliding contact 22 with one end of the excitation coil 23b of a first electromagnet 23, the other end of which is connected to the negative terminal or pole of any suitable and therefore not further particularly illustrated DC power supply source.

The second contact arm 20 cooperates with a contact 24 which is coupled with one end of an excitation coil 25b of a second electromagnet 25, the other end of which is likewise connected to the aforementioned negative pole of the DC power supply source, as shown.

Further, the second contact arm 20 is coupled via a sliding contact 26 with one contact 27a of a switch 27 at which there is additionally connected the conductor 11 which is in circuit with the clock or timer 8.

The other contact 27b of the switch 27 is connected with the positive pole or terminal of the DC power supply source and secured to armature 23a of the first electromagnet 23. At the free end of this armature 23a, there is pivotably mounted an advancing or indexing pawl 28 which engages with the tooth gaps between the ratchet teeth 29 arranged at a peripheral section of ratchet wheel 21.

The indexing pawl 28 is additionally coupled with the armature 25a of the second electromagnet 25 serving to actuate a blocking or locking pawl 30 which can be pressed through the action of a spring 30a into the tooth gaps between the ratchet teeth 31 which extend over another portion of the periphery of the ratchet wheel 21.

A spring 32 eccentrically engaged with the ratchet wheel 21, so that when the pawls 28 and 30 are released, the ratchet wheel 31 will be rotated in a direction opposite to the rotational direction indicated by the arrow, back to its rest position.

The ciphered text which appears at the perforated tape 2, as already mentioned, is subdivided into five character groups. Hence, normally the information appearing at the perforated tape 2 is composed of a leading portion having several technical signals followed by five first text characters, then at least one technical signal (intermediate space) and five further text characters, and so forth.

In order to decipher the ciphered text appearing at the perforated tape 2, the clock 8 is switched-on. The perforated tape reader 1 now scans in known manner each signal at the perforated tape 2, the scanned information being transformed at the code converter 4 and if this signal is a text character such is then delivered to the deciphering unit 6. Additionally, the clock 8 places into operation the signal evaluation device and signal counter 9, the mode of operation of which will be hereinafter considered in conjunction with FIG. 2.

The first contact arm 18 is portrayed in contact with the contact 16 designated by reference character 1, which in effect means that the signal counter is prepared to count the text character signals.

Now if the first of the five text character signals of a character group are delivered via the conductor 12 to the signal evaluation device 13, then the signal evaluation device 13 transmits the text character signal to the output conductor line 14. As a result, the first electromagnet 23 is briefly energized through the action of the output conductor 14, the contact arm 18 and the sliding contact 22, so that armature 23a of electromagnet 23 is energized. The advancing or indexing pawl 28 indexes by one step the ratchet wheel 21, the blocking pawl 30 preventing the spring 32 from reverse rotating the ratchet wheel 21. During rotation of the ratchet wheel 21 through one step, the contact arms 18 and 20 are simultaneously rotated by one step or indexing division via the shaft 19, as a result of which contact arm 18 comes into contact with the contact 16 designated by reference character 2.

Upon actuation of the armature 23a of the electromagnet 23, the switch 27 is opened, as a result of which there is transmitted through the agency of the conductor 11 to the clock 8 a count reporting pulse (interruption pulse).

During indexing of the contact arm 18 by one step, the current circuit of the excitation coil 23b of the electromagnet 23 is interrupted and the contact arm 18 of the signal counter remains at contact 16 designated by reference character 2, until the second text character signal of the character group, as described, initiates a further indexing operation.

The fifth text character signal brings about in the described manner further rotation or indexing of the contact arm 18 from the contact 16 designated by reference character 5 to the empty contact location 6, wherein at the same time the second contact arm 20 comes into contact with the contact 24.

If the armature 23a of the electromagnet 23 is again deactivated after reporting the fifth counter step to the clock 8, then the switch 27 closes. Consequently, there is closed the current circuit composed of the positive poleswitch 27- contact arm 20-electromagnet 25-negative pole, causing the armature 25a to be attracted. Consequently, the pawls 28 and 30 are brought out of engagement with the ratchet wheel 21, and the latter is rotated back by the action of the spring 32 until the contact 18 bears upon the stop 18a and in this position is coupled with the contact 17 designated by reference character 0. In the meantime the current circuit of the excitation winding 25b of the electromagnet 25 is interrupted and the pawls 28 and 30 again engage between the teeth 29 and 31 respectively of the ratchet wheel 21.

If a technical signal is delivered to the signal evaluation device 13, something which occurs normally after five text character signals or at the beginning of a message, then the signal appearing at the output line or conductor 15 causes energization of the electromagnet 23 via the contact arm 18 located in its 0-position, and which in the already described manner causes indexing of the ratchet wheel 21, so that the contact arm 18 is brought into contact with the contact 16 designated by reference character 1 and the clock 8 has delivered through the agency of the conductor 11 a count report pulse.

The signal counter in this position is again prepared for counting the five text character signals of the next character group which normally follow the technical signal.

Now if during transmission, it happens for instance that one of the text characters is transformed into a technical signal, then this technical signal appears at the output conductor 15 whereas the contact arm 18 bears upon one of the contacts 16 designated by reference numerals 1–5 and which are associated with the text character signals. Since in this instance the electromagnet 23 is not energized, and the switch 27 is not opened, no signal reporting or feedback to the clock 8 occurs via the conductor or line 11. The clock 8 is stopped and in turn switches off the reader 1 and the deciphering unit 6. At the same time, a non-illustrated alarm device is placed into operation which indicates to the operator shutdown of the installation.

On the other hand, if after counting five text character signals there does not appear any technical signal, rather a further text character signal appears at the output conductor 14, then the electromagnet 23 is not energized since the contact arm 18 is located in its 0-position in which it is coupled with the contact 17 designated by reference character 0. Since no feedback or reporting pulse is delivered to the clock 8 via the conductor 11, the clock 8 is therefore also shutdown.

As will be evident from the foregoing description, shutdown or stopping of the clock or timer and therefore the entire installation occurs whenever there either appears within a character group a technical signal instead of a text character or after the last text character of a character group there does not occur any technical signal.

Instead of using the previously discussed electromechanical signal counter, it is also possible to use all other signal counters of suitable design. Additionally, the installation could of course also be employed for evaluating data carriers other than perforated data or information carriers. For instance, it would be conceivable to employ magnetic tapes or the like. Depending upon the nature of the character, the reader 1 is to be appropriately designed.

While there is shown and described present preferred embodiments of the invention, it is to be distinctly understood that the invention is not limited thereto, but may be otherwise variously embodied and practiced within the scope of the following claims. Accordingly,

What is claimed is:

1. An apparatus for deciphering ciphered texts, which are present at information carriers in the form of character groups of the same number of characters, said character groups being separated from each other by control character elements, comprising a reader for the information carrier, a clocking device for driving the reader, a deciphering unit controlled both by the clocking device and the reader, a signal evaluation device controlled by said reader, said signal evaluation device producing a first output signal in correspondence to the signals of each character and a second output signal in correspondence to the control character element signals, the output sides of said signal evaluation device being connected to the input side of a signal counter operating in a cyclical manner and having a counting capacity corresponding to the number of characters of each character group, said signal counter being advanced by one step by each of said first output signals, a control circuit connected to said clocking device, said control circuit being activated each time said signal counter is advanced by one step, such that the signal evaluation device advances said signal counter by means of its second output signals from a start position to a first position and said signal counter stops said clocking device by means of said control circuit, as soon as the signal counter receives in its start position one of said first output signals and receives in any position other than the start position one of said second output signals of the signal evaluation device.

2. The apparatus as defined in claim 1, wherein said signal evaluation device has a first output for said first output signals and a second output for said second output signals, and wherein said signal counter has a first contact and a group of second contacts corresponding in number to the number of characters of each character group, said first contact being connected to said second output and all of said second contacts being connected to said first output of said signal evaluation device, there being provided a contact arm common to all of said first and second contacts, said contact arm being drivingly coupled to a step-by-step mechanism, the electrical circuit for advancing said step-by-step mechanism including said first and second contacts and said contact arm.

3. The apparatus as defined in claim 2, further including a first electromagnet, having an energizing coil connected to said electrical circuit for advancing said step-by-step mechanism;

said first electromagnet having an armature;

said control circuit having a switch;

a ratchet wheel for rotating said switch arm;

an indexing pawl for advancing said ratchet wheel;

said armature operating said indexing pawl to advance said ratchet wheel and operating said control circuit switch each time said energizing coil is activated.

4. The apparatus as defined in claim 3, further including a return spring attached to said ratchet wheel for exerting a return force upon said ratchet wheel and a blocking pawl normally engaging said ratchet wheel for preventing a return movement of said ratchet wheel.

5. The apparatus as defined in claim 4, further including a second contact arm driven by said ratchet wheel;

a second electromagnet having an energizing coil and an armature coupled to said indexing and blocking pawls;

second contact means engaged by said second contact arm when said ratchet wheel is advanced a predetermined number of times to energize said second electromagnet which, in turn, disengages said indexing and blocking pawls from said ratchet wheel causing the wheel to be reset by the return spring returning the first contact arm into engagement with said second output;

* * * * *